United States Patent [19]

Mischenko

[11] Patent Number: 5,028,083

[45] Date of Patent: Jul. 2, 1991

[54] LATCH ASSEMBLY

[75] Inventor: Nicholas Mischenko, Mount Prospect, Ill.

[73] Assignee: Motorola, Inc., Schaumburg, Ill.

[21] Appl. No.: 515,921

[22] Filed: Apr. 27, 1990

[51] Int. Cl.⁵ .............................................. E05C 1/00
[52] U.S. Cl. .................................. 292/175; 248/221.4
[58] Field of Search ...................... 248/685, 201, 220.2, 248/221.4, 222.2, 222.1, 223.4; 292/175, 163, DIG. 38, DIG. 53

[56] References Cited

U.S. PATENT DOCUMENTS

| 361,693 | 4/1887 | Guild | 292/175 |
|---|---|---|---|
| 2,144,885 | 1/1939 | MacFadden | 248/221.4 |
| 3,671,065 | 6/1972 | Bingham | 292/DIG. 38 |
| 4,223,787 | 9/1980 | Lowry | 292/175 |

FOREIGN PATENT DOCUMENTS

| 2028150 | 7/1971 | Fed. Rep. of Germany | 292/175 |
|---|---|---|---|
| 2600396 | 7/1976 | Fed. Rep. of Germany | 292/175 |
| 2911896 | 10/1980 | Fed. Rep. of Germany | 292/175 |

*Primary Examiner*—Ramon O. Ramirez
*Assistant Examiner*—Robert A. Olson
*Attorney, Agent, or Firm*—Robert H. Kelly

[57] ABSTRACT

A latch assembly for maintaining a battery in position upon a portable telephone. The latch assembly includes a latch body having at least one face surface forming a latching surface for abuttingly engaging with the battery to maintain the battery in position. A spring member exerts a spring force for maintaining the latch body and, hence, the latching surface formed thereupon in the abutting relationship with the battery. A downward force exerted upon the latch body causes translation thereof to remove the latching surface from the abutting engagement with the battery.

10 Claims, 2 Drawing Sheets

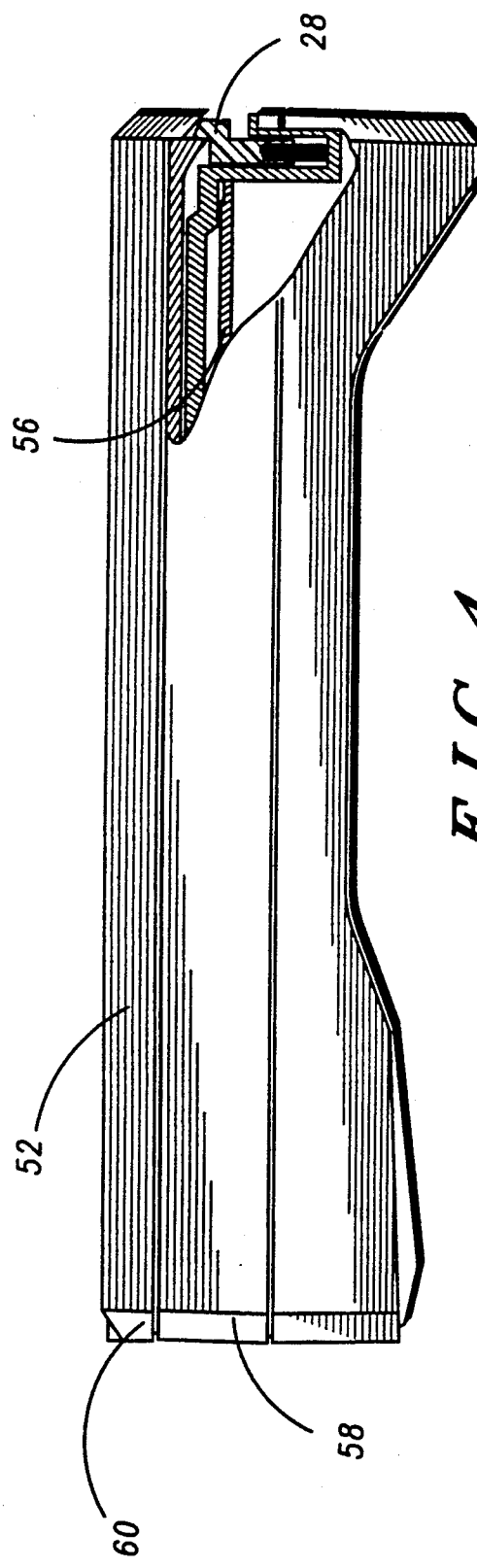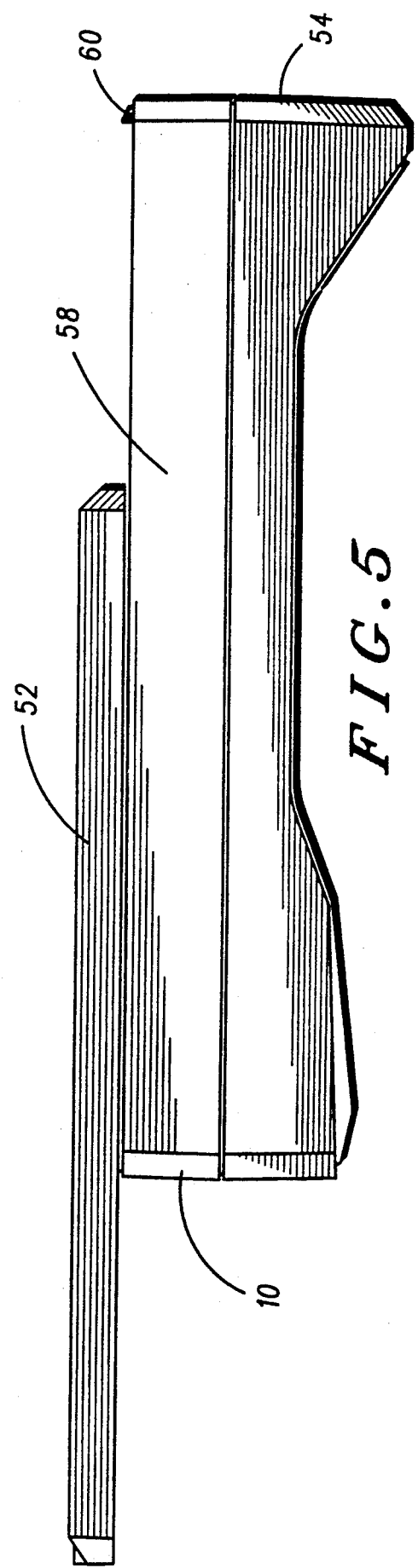

LATCH ASSEMBLY

BACKGROUND OF THE INVENTION

The present invention relates generally to latching apparatus, and, more particularly, to a latch assembly for maintaining a battery in position upon a housing of a portable telephone.

Portable, cellular phones are increasingly utilized to permit a user to communicate telephonically at virtually any location. For instance, portable telephones are frequently positioned in automobiles to permit telephone communication by a user travelling in an automobile. The portable telephone transmits a low wattage, radio frequency signal to a receiving station whereat connections are provided with conventional telephone systems. Numerous receiving stations are spaced apart at fixed locations in an area to receive the signals transmitted by the portable telephone as the portable telephone is transported in the automobile, or otherwise, throughout the area.

The portable telephone must be coupled to a power supply in order to generate and transmit the radio frequency signal. In order to increase the portability of the portable telephone, the power supply is comprised of a battery power source which is electrically coupled to the portable telephone. In fact, in some designs, the housing assembly of the portable telephone includes appropriate support structure to support the battery thereupon, thereby permitting the battery to be carried with the portable telephone.

However, the battery can store only a finite amount of energy which may be converted into electrical power to power the portable telephone. Therefore, after a certain period of use of the telephone, the battery must be removed from the portable telephone, and replaced with a fresh battery to permit continued operation of the portable telephone. The frequency with which the battery must be replaced is, of course, dependent upon the actual battery capacity, and the power consumption of the telephone. Generally, because a conventional nickel-cadmium battery typically utilized to power the portable telephone becomes depleted of stored energy after as little as two, or even fewer, hours of operation of the portable telephone, the battery must be replaced at frequent intervals.

Therefore, the means by which the battery is connected to the portable telephone must permit the battery to be replaced quickly and easily. One conventional design of a portable telephone housing includes guide tracks formed above a top surface of the portable telephone housing to permit sliding engagement with corresponding rail members formed on a bottom surface of the battery. By engaging the rails formed on the bottom surface of the battery with the guide tracks formed on the telephone housing, and then sliding the battery therealong, the battery may be positioned to permit carriage thereof by the portable telephone. The housing of the portable telephone also typically includes a stop formed at an end of the top surface to support a first end of the battery in position when suitably engaged with the guide rails of the portable telephone housing. A latch assembly is mounted to the telephone at an end of the portable telephone housing opposite that of the stop. The latch assembly maintains the battery in position once the battery is suitably positioned to abut, at opposite ends, the stop and the latch assembly. The battery is thereby held in position upon the top surface of the portable telephone housing to be carried therewith. Suitable electrical connecting elements electrically connect the battery and the portable telephone theretogether when the battery is properly positioned to power the portable telephone thereby.

Existing latch assemblies for supporting the battery in position upon the portable telephone housing are typically each comprised of a four-piece assembly. A first piece, a first plate member, is fixedly attached to the housing of the portable telephone by a fastening member, such as a screw element, which comprises the second piece. A third piece, a T-shaped element, is interconnected with the plate member by way of the fastening member, with the fourth piece, a spring member, positioned therebetween to provide a spring force to position a portion of the top surface of the T-shaped element above the top surface of the plate element. This portion of the T-shaped element forms a latching surface to permit abutting engagement with the battery to maintain the battery in position upon the top surface of the housing.

Such a latch assembly, however, requires a multiple-step process in order to affix the latch assembly to the housing of the portable telephone. Such a process is time consuming, and, additionally, is susceptible to assembly error, and/or subsequent failure during use of the assembly.

Furthermore, increased miniaturization of portable telephones allow the portable telephones to be packaged in housings of ever smaller dimensions. The three-piece latch assembly described hereinabove is of dimensions which limits further decrease in housing size of the portable telephone.

Therefore, a new latching assembly design is required which is of simpler construction as well as of smaller dimensions.

SUMMARY OF THE INVENTION

It is accordingly an object of the present invention to provide a latch assembly of simpler construction.

It is a further object of the present invention to provide a latch assembly of reduced dimensions.

In accordance with the present invention, therefore, a latch assembly for latching an object upon a housing is disclosed. The latch assembly includes a latch body having at least one surface forming a latching surface for permitting abutting engagement thereof with the object for maintaining the object in a desired position upon the housing. The latch assembly is engaged with the housing to permit the latching surface of the latch body to be positioned in the abutting engagement with the object, and the latch assembly is maintained in the abutting engagement with the housing in order to permit the latching surface of the latch body to be maintained in the abutting relationship with the object.

BRIEF DESCRIPTION OF THE DRAWINGS

The present invention will be better understood when read in light of the accompanying drawings in which:

FIG. 4 is a side elevational view of a portable transceiver telephone utilizing the latch assembly of the present invention for latching a battery in position upon a top surface of the portable transceiver housing; and FIG. 5 is a side-elevational view, similar to that of FIG. 4, but illustrating the position of the latch assembly of the present invention during removal and/or replacement of the battery positioned in FIG. 4 upon the top surface of the housing of the portable transceiver.

DESCRIPTION OF THE PREFERRED EMBODIMENTS

Figure 1:
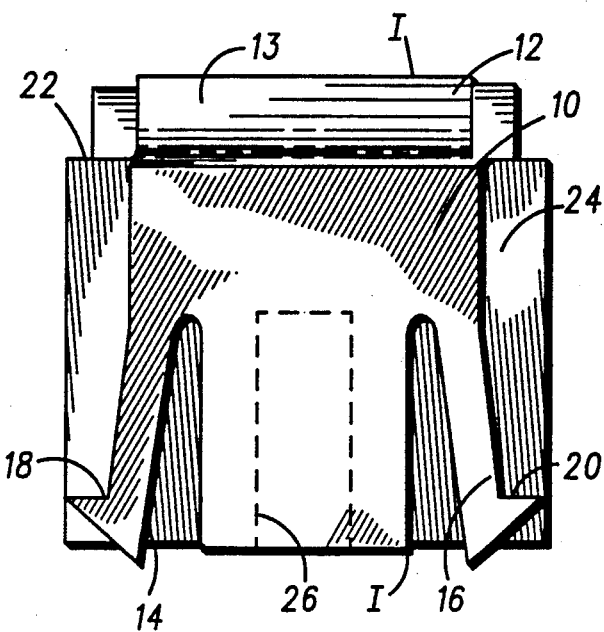
FIG. 1 is an isometric illustration of the latch body forming a portion of the latch assembly of the present invention.

Referring first to the isometric illustration of FIG. 1, there is shown the latch body 10 forming a portion of the latch assembly of the present invention. Latch body 10 contains at least one surface forming a latching surface. In the preferred embodiment illustrated in FIG. 1, latch body 10 includes projection 12 having surface 13, for forming the latching surface thereby.

Projecting from opposing side walls of latch body 10 are fastening bars 14 and 16. Fastening bars 14 and 16 extend at downwardly projecting angles from the latch body 10. Top surfaces of end portions of fastening bars 14 and 16 are formed to extend at angles perpendicular to the longitudinal direction of latch body 10, and form locking tabs 18 and 20, respectively, thereby. In the preferred embodiment of the present invention, fastening bars 14 and 16 are formed integral with the latch body 10. As will be described more fully hereinbelow, locking tabs 18 and 20 form force transmitting surfaces.

As illustrated in the isometric view of FIG. 1 of the preferred embodiment of the present invention, fastening bars 14 and 16 are formed integral with latch body 10 and have depthwise dimensions of approximately half the depthwise dimensions of latch body 10. Formed posterior to the fastening bars 14 and 16, are guide rails 22 and 24, respectively. Guide rails 22 and 24 extend longitudinally along substantially the entire lengths of the respective sidewalls of latch body 10. Guide rails 22 and 24, similar to fastening bars 14 and 16, are preferably formed integral with the latch body 10. FIG. 1 further illustrates, in hatch, central bore 26 extending longitudinally into latch body 10.

In the preferred embodiment of the present invention, latch body 10, fastening bars 14 and 16, and guide rails 22 and 24, are integrally formed of a flexible, plastic material such as, for example, "DELRIN" (TM), or some other such material having low friction characteristics.

Figure 2:
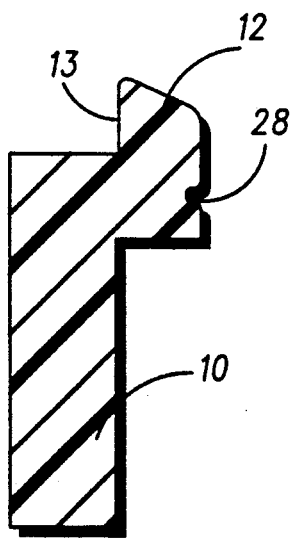
FIG. 2 is a sectional view taken along line I—I of FIG. 1.

FIG. 2 is a sectional view taken along line I—I of FIG. 1. The sectional view of FIG. 2 better illustrates the relationship between latch body projection 12 projecting main body portion of latch body 10. Latching surface 13, formed of a face surface of projection 12, permits abutting engagement of an object with the surface 13 to latch the object in a desired position. FIG. 2 further illustrates horizontally extending slot 28 extending horizontally along a surface of projection 12 opposite latching surface 13.

Figure 3:
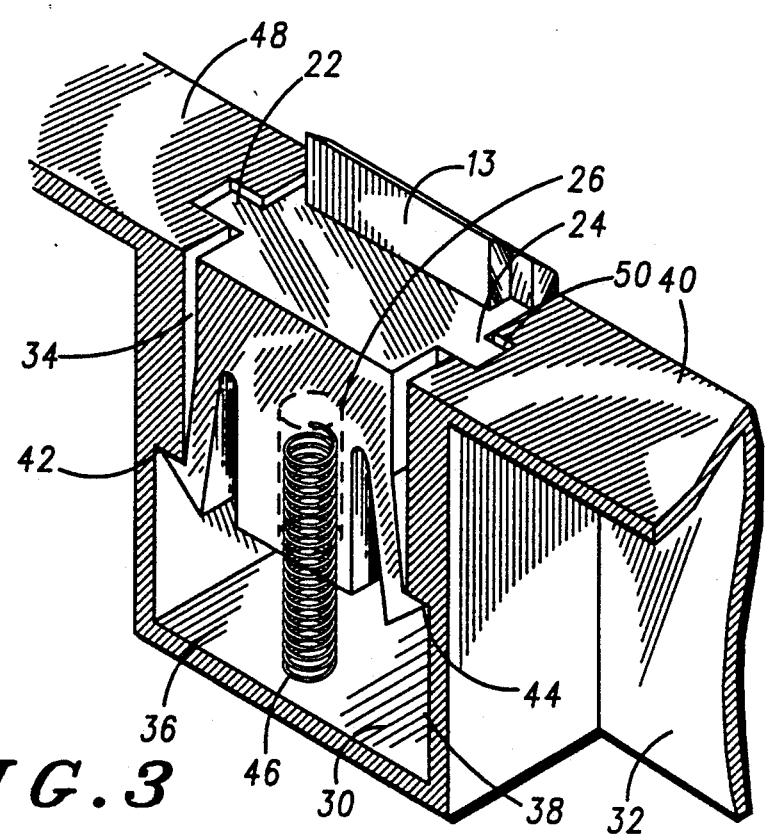
FIG. 3 is a perspective illustration of the latch assembly of the present invention positioned in a latch pocket formed in a housing, such as a housing of a portable telephone.

FIG. 3 illustrates latch body 10 of the latch assembly of the present invention positioned within a latch pocket, referred to generally by reference numeral 30, formed in a housing 32, a portion of which is shown in the figure. Latch pocket 30 is defined by walls 34, 36, and 38 of a flange portion 40 of the housing 32. Walls 34 and 38 contain lower portions of reduced diametrical dimensions defining steps 42 and 44 which form surfaces suitable for abutting engagement with the locking tabs 18 and 20 of fastening bars 14 and 16, respectively.

FIG. 3 further illustrates spring member 46 having a first side thereof seated in bore 26 extending into latch body 10, and a second side thereof seated against wall 36 defining the latch pocket 30. Spring member 46 generates a spring force, i.e., a latching force, for maintaining the locking tabs 18 and 20 of fastening bars 14 and 16 in the abutting engagement with the steps 42 and 44 defined by walls 34 and 38.

Walls 34 and 38 further have guide tracks 48 and 50, respectively, formed therein and have dimensions to permit guide rails 22 and 24 extending from latch body 10 to slidingly engage therewith.

The upward force generated by the spring member 46 maintains the locking tabs 18 and 20 in the abutting engagement with steps 42 and 44 of walls 34 and 38, thereby transmitting the force exerted by the spring member 46 upon latch body 10 to housing 32, and thereby maintaining the latching surface 13 formed of latch body projection 12 in a position extending above a surface formed by flange 40 of housing 32. However, a downward force exerted upon latch body 10, or upon projection 12 of latch body 10 which is greater than the upward, spring force generated by spring member 46, causes downward translation of the latch body 10. Because guide rails 22 and 24 slidingly engage with interfitting guide tracks formed in walls 34 and 38 of latch pocket 30, vertical translation is permitted. Continued downward vertical translation of latch body 10 is limited by contact of a bottom end of body 10, and/or bottom ends of fastening bars 14 and 16 with wall 36 of latch pocket 30. Preferably, and as illustrated, steps 42 and 44 defined by walls 34 and 38 are positioned to define a length between the respective steps 42 and 44 and bottom wall 36 so as to permit continued downward translation of latch body 10 until latch body projection 12, and latching surface 13 defined thereby, is positioned beneath the surface defined by flange 40 of housing 32. When downward force is no longer applied to latch body 10, the upward spring force exerted by spring member 46 causes upward translation of latch body 10 until locking tabs 18 and 20 abuttingly engage with the surfaces formed by steps 42 and 44.

Turning now to the side-elevational view of FIG. 4, there is shown a battery 52 positioned upon a portable transceiver 54, such as a portable telephone.

While the following description describes the latch assembly of the present invention in connection with transceiver 54, it is to be understood that the latch assembly may be utilized with many other types of apparatus to latch an object thereto. The latch assembly of the present invention maintains the battery in position upon the transceiver 54. Transceiver 54 includes appropriate transmit/receive circuitry, indicated by printed circuit board 56 shown in the cutaway portion of the Figure. The transmit/receive circuitry disposed upon circuit board permits transmission and reception of radio frequency signals. Transmit/receive circuitry 56 is supported within housing 58 of the transceiver 54. Projecting from a top surface of housing 58 is stop 60, shown in hatch, which positions a first end of battery 52. Battery 52 is of lengthwise dimension such that, when a first end of battery 52 abuts against stop 60, a second end of battery 52 abuttingly engages with the latching surface 13 of latch body 10. The battery 52 is thereby fixedly positioned upon housing 58 of transceiver 54 to be carried therewith.

After operation of transceiver 54, battery 52 becomes depleted of stored energy, and must be replaced in order to permit continued operation of the transceiver 54. A downward force may be applied to latch body 10, such as for example, by applying a downward force to slot 28 formed on projection 12. The downward force causes downward translation of latch body 10 to position projection 12 and latch surface 14, formed thereupon, beneath the bottom surface of battery 52. Battery 52 is then permitted translation along the top surface of housing 58 of transceiver 54.

FIG. 5 is a side-elevational view, similar to that of FIG. 4, but illustrating the battery 52 as the battery 52 is either being removed from, or being replaced upon, housing 58 of transceiver 54. Latch body 10 has been translated downwardly such that latching surface 14 of projection 12 is positioned beneath the lower surface of battery 52 so as not to impede movement of battery 52. A downward force exerted by the battery 52 while the battery is positioned above latch body 10 maintains the latch body in such depressed position. Once battery 52 has been either completely removed from housing 58 of transceiver 54, or repositioned upon the housing 58 as illustrated in FIG. 3, the upward force exerted by spring member 46 causes vertical translation of latch body 10 until locking tabs 18 and 20 abuttingly engage with steps 42 and 44, as illustrated in FIG. 3. Latching surface 14 of projection 12 thereby provides a latching surface for maintaining battery 52 in position upon housing 58 of transceiver 54.

While the present invention has been described in connection with the preferred embodiment of the various figures, it is to be understood that other similar embodiments may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A portable transceiver comprising the combination of:
   a transmit/receive assembly;
   a housing for housing said transmit/receive assembly;
   a battery carried upon said housing for powering said transmit/receive assembly;
   a latch body having at least a first face surface and a second face surface opposed thereto, said first face surface of the latch body having a portion disposed at a first end thereof forming a latching surface for latching the battery in position upon the housing, and said second face surface of the latch body having a portion disposed at a first end thereof forming a force receiving surface for receiving a vertical translation force thereat;
   means forming a latch pocket affixed to the housing having first, second, and third walls wherein said first and second walls extend in parallel directions, said first wall being spaced apart from said second wall at a distance for receiving the latch body in the area defined therebetween, and said third wall extends between the first and second walls at bottom portions thereof, respectively;
   means forming first and second fastening bars projecting from the first and second sidewalls, respectively, of the latch body, said first and second fastening bars each having end portions forming locking tabs for abutting against corresponding surfaces formed upon the first wall and the second wall of the latch pocket;
   means forming a bore extending into the latch body at an end of the the latch body opposite that of said first ends of the first and second face surfaces, respectively, said bore formed thereby being disposed in a plane defined by the first and second fastening bars projecting from the first and second sidewalls of the latch body; and
   means forming a spring having a first end portion thereof seated within the bore formed to extend extending into the latch body and a second end portion thereof seated against the third wall of the latch pocket whereby a spring force exerted thereby maintains the locking tabs of said first and second fastening bars in abutting engagement with the corresponding surfaces formed upon the first wall and the second wall of the latch pocket, and whereby application of the vertical translation force against the force receiving surface of the latch body causes translation of the latch body and the latching surface forming a portion thereof, and compression of the spring.

2. A latch assembly for latching an object in position upon a housing, said latch assembly comprising:
   a latch body having at least a first face surface and a second face surface opposed thereto, said first face surface of the latch body having a portion disposed at a first end thereof forming a latching surface for latching the object in position upon the housing, and said second face surface of the latch body having a portion disposed at a first end thereof forming a force receiving surface for receiving a vertical translation force thereat;
   means forming a latch pocket affixed to the housing having first, second, and third walls wherein said first and second walls extend in parallel directions, said first wall being spaced apart from said second wall at a distance for receiving the latch body in the area defined therebetween, and said third wall extends between the first and second walls at bottom portions thereof, respectively;
   means forming first and second fastening bars projecting from the first and second sidewalls, respectively, of the latch body, said first and second fastening bars each having end portions forming locking tabs for abutting against corresponding surfaces formed upon the first wall and the second wall of the latch pocket;
   means forming a bore extending into the latch body at an end of the the latch body opposite that of said first ends of the first and second face surfaces, respectively, said bore formed thereby being disposed in a plane defined by the first and second fastening bars projecting from the first and second sidewalls of the latch body; and
   means forming a spring having a first end portion thereof seated within the bore formed to extend into the latch body and a second end portion thereof seated against the third wall of the latch pocket whereby a spring force exerted thereby maintains the locking tabs of said first and second fastening bars in abutting engagement with the corresponding surfaces formed upon the first wall and the second wall of the latch pocket, and whereby application of the vertical translation force against the force receiving surface of the latch body causes translation of the latch body and the latching surface forming a portion thereof, and compression of the spring.

3. The latch assembly of claim 2 wherein said latch body further comprises a projection extending above a top end of the latch body wherein said latching surface is formed upon said projection.

4. The latch assembly of claim 2 wherein said latch body further comprises longitudinally extending rail members formed along sidewalls of the latch body for engaging with corresponding guide tracks formed in the first and second sidewalls of the latch pocket to permit sliding engagement therebetween.

5. The latch assembly of claim 2 wherein said latch body and said means forming first and second fastening bars are integrally formed.

6. The latch assembly of claim 2 wherein said latch body is permitted limited vertical translation relative to the housing for positioning said latching surface in said abutting engagement with the object when the locking tabs of the first and second fastening bars abut against the corresponding surfaces of the first wall and the second wall of the latch pocket, or, alternately, out of said abutting engagement with the object when the locking tabs of the first and second fastening bars are moved out of abutting engagement with the corresponding surfaces of the first wall and the second wall of the latch pocket.

7. A battery latch assembly for maintaining a battery in a desired position upon a housing of a portable transceiver, said battery latch assembly comprising:

a latch body having at least a first face surface and a second face surface opposed thereto, said first face surface of the latch body having a portion disposed at a first end thereof forming a latching surface for latching the battery in position upon the housing, and said second face surface of the latch body having a portion disposed at a first end thereof forming a force receiving surface for receiving a vertical translation force thereat;

means forming a latch pocket affixed to the housing having first, second, and third walls wherein said first and second walls extend in parallel directions, said first wall being spaced apart from said second wall at a distance for receiving the latch body in the area defined therebetween, and said third wall extends between the first and second walls at bottom portions thereof, respectively;

means forming first and second fastening bars projecting from the first and second sidewalls, respectively, of the latch body, said first and secon fastening bars each having end portions forming locking tabs for abutting against corresponding surfaces formed upon the first wall and the second wall of the latch pocket;

means forming a bore extending into the latch body at an end of the the latch body opposite that of said first ends of the first and second face surfaces, respectively, said bore formed thereby is disposed in a plane defined by the first and second fastening bars projecting from the first and second sidewalls of the latch body; and means forming a spring having a first end portion thereof seated within the bore formed to extend into the latch body and a second end portion thereof seated against the third wall of the latch pocket whereby a spring force exerted thereby maintains the locking tabs of said first and second fastening bars in abutting engagement with the corresponding surfaces formed upon the first wall and the second wall of the latch pocket, and whereby application of the vertical translation force against the force receiving surface of the latch body causes translation of the latch body and the latching surface forming a portion thereof.

8. The latch assembly of claim 7 wherein said latch body further comprises longitudinally extending rail members formed along opposing sidewalls of the latch body for engaging with corresponding guide tracks formed in the first and second sidewalls, respectively, of the latch pocket to permit sliding engagement therebetween.

9. The latch assembly of claim 7 wherein said latch body and said first and second fastening bars are integrally formed.

10. The latch assembly of claim 7 wherein said latch body is permitted limited vertical translation relative to the housing for positioning said latching surface in said abutting engagement with the battery when the locking tabs of the first and second fastening bars abut against the corresponding surfaces of the first wall and the second wall of the latch pocket, or, alternately, out of said abutting engagement with the battery.

* * * * *